(No Model.) 2 Sheets—Sheet 1.
S. D. CARPENTER.
BICYCLE.
No. 600,404. Patented Mar. 8, 1898.
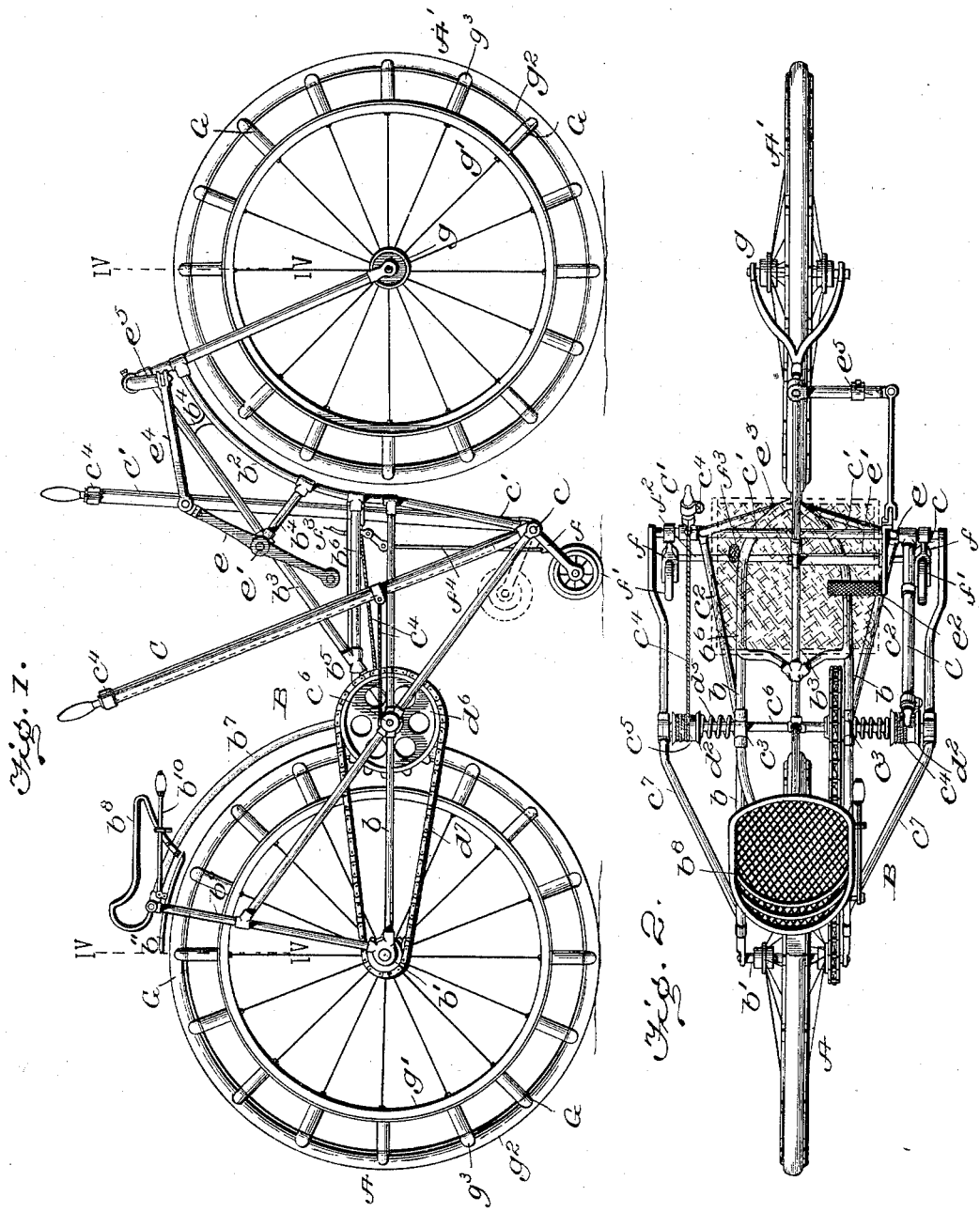
Witnesses
Edw. J. Duvall Jr.
Charles E. Riordon
Inventor
S. D. Carpenter
By Butterworth & Powell
His Attorneys.

(No Model.) 2 Sheets—Sheet 2.

S. D. CARPENTER.
BICYCLE.

No. 600,404. Patented Mar. 8, 1898.

Witnesses
Edw. S. Duvall Jr.
Charles E. Riordon

Inventor
S. D. Carpenter
By Butterworth
McDowell
His Attorneys.

UNITED STATES PATENT OFFICE.

STEPHEN D. CARPENTER, OF SPOKANE, WASHINGTON.

BICYCLE.

SPECIFICATION forming part of Letters Patent No. 600,404, dated March 8, 1898.

Application filed March 29, 1897. Serial No. 629,817. (No model.)

*To all whom it may concern:*

Be it known that I, STEPHEN D. CARPENTER, a citizen of the United States, residing at Spokane, in the county of Spokane and State of Washington, have invented certain new and useful Improvements in Bicycles; and I do hereby declare the following to be a full, clear, and exact description of the invention, such as will enable others skilled in the art to which it appertains to make and use the same.

This invention relates to bicycles and other vehicles, but more particularly to hand-operated bicycles.

The primary object of the invention is to provide a simple, strong, and efficient bicycle which will enable the rider to utilize the entire power which he is capable of bringing into action with his arms, whereby the dead-centers and the loss of power incident to the pedal mechanism usually employed may be avoided.

The invention will first be hereinafter more particularly described with reference to the accompanying drawings, which form a part of this specification, and then pointed out in the claims at the end of the description.

Figure 3:
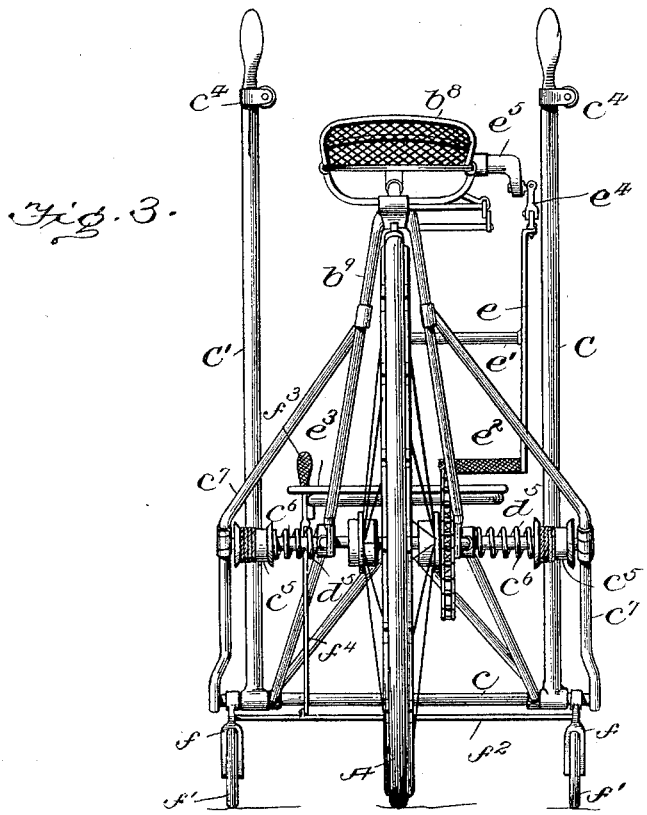
Figure 4:
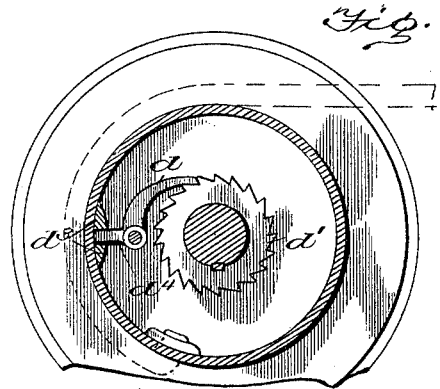
Figure 5:
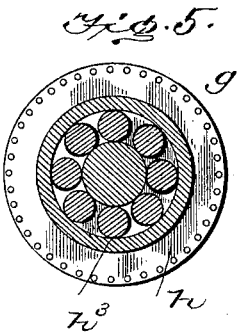
Figure 6:
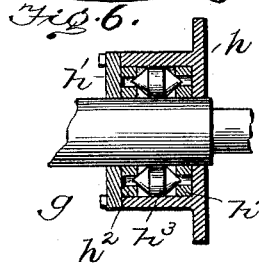

In the drawings, wherein similar letters of reference denote similar parts, Figure 1 is a side elevation of a bicycle embodying my invention. Fig. 2 is a plan view. Fig. 3 is an elevation looking at the rear of the machine. Fig. 4 is a detail sectional view through one of the ratchet-operating drums of the driving mechanism, illustrating means for positively throwing the pawl into engagement with the ratchet-wheel when the drum is rotated in one direction and for positively releasing and holding the pawl disengaged from the ratchet-wheel when rotated in the opposite direction, so as to prevent clicking and wear of the pawl and the teeth of the ratchet-wheel during the return movement of the drum; and Figs. 5 and 6 are transverse and longitudinal sectional views, respectively, of one of the casings of the antifriction-bearings.

The driving-wheel A and the driven wheel A' may be provided with antifriction-bearings, to be hereinafter explained, and may be journaled upon suitable shafts secured in the frame B. This frame may have the bars $b$ arranged on opposite sides of the longitudinal center of the vehicle, so as to support the shaft $b'$ of the driving-wheel, the forward ends of said bars being curved inwardly, so as to form a substantially U-shaped supporting-bar and have their forward ends secured to an upright bar or frame-piece $b^2$. The frame-piece $b^2$ may be curved and arranged concentric to the wheel A' and may have its upper end provided with a socket-piece, in which the steering-post, projecting from the forward fork, may rotate in the usual manner. A rod $b^3$ may be rigidly secured to the frame-piece $b^2$ by suitable braces, as at $b^4$, and may have one end thereof provided with a socket-piece similar to that of the frame-piece $b^2$, while its other end extends downwardly and rearwardly and is secured to a union-piece $b^5$. To the union-piece may be secured the rear ends of a shield-shaped brace $b^6$, while the forward ends of said brace may be secured to the frame-piece $b^2$, a suitable rod being employed to connect the union-piece to the rearwardly-curved bar or frame-piece $b^7$ in order that the several parts may be rigidly braced. The curved bar $b^7$ may support a preferably wide saddle or seat, as at $b^8$, having the bottom or seat portion thereof of suitable open-work and provided with an upwardly-turned back or rear support in order that a comfortable and secure seat may be provided for the rider. The upper end of the curved bar or frame-piece $b^7$ may be connected to the rear fork $b^9$ and may have a lever $b^{10}$ pivoted thereto within convenient reach of the rider and provided with a brake-shoe $b^{11}$ on one of its ends adapted to be forced against the tire of the wheel A when it is desired to stop or lessen the speed of the vehicle.

For the purpose of propelling the vehicle and for rigidly holding the parts in position I may provide a shaft $c$, to which the lower ends of the vertically-arranged operating-levers C and C' are pivoted, so as to vibrate or oscillate lengthwise of the machine. This shaft is arranged transversely of the machine and may be supported by the rods $c'$, extending from and secured to the frame-piece $b^2$, and the rearwardly and upwardly extending bars $c^2$, which have their upper ends secured to the union-pieces or bearings $c^3$ on the bars $b$. The operating-levers C and C' may each comprise two telescopic members, the member to which the handle is secured being adapted to slide within the outer or pivoted member, while the pivoted or outer member may have its upper end slotted for a portion of its length to permit a split collar, as at $c^8$, provided with a tightening thumb or other screw adapted to compress the upper portion of the outer member into frictional engagement with the inner member when the thumbnut is rotated, so as to draw the split portions of the collar together, thus securing any desired length of leverage, though other means may be provided for adjustably securing the members together, or levers comprising a single member may be employed, if desired. Flexible connections, as at $c^4$, have one of their ends secured to the operating-levers and their other ends affixed to drums $c^5$, arranged on the driving-shaft $c^6$, so that as the levers are vibrated or oscillated on their pivots the drums will be rotated in one direction on said shaft. This driving-shaft may be journaled in the bearings $c^3$ and may have its outer ends supported in bearings on rods $c^7$, which latter have one of their ends secured to members of the rear fork, while their other ends are secured to the outer ends of the shaft $c$, to which the operating-levers are pivoted, thus rigidly supporting said shaft and bracing the frame against longitudinal strains. The drums $c^5$ are loosely mounted on the driving-shaft, and each has a pawl $d$, Fig. 4, pivoted thereto and adapted to engage teeth in a ratchet-wheel $d'$, which latter is rigidly secured to the driving-shaft $c^6$, so as to permit the drum and ratchet to be rotated together or independently of each other. Each drum may have two flanges, one of which is rigidly secured to or formed integrally with the sleeve or rim of the drum, while the other, as at $d^2$, (removed in Fig. 5 and to which the pawl is pivoted,) is secured to the drum, so as to permit the drum to have a slight rotary movement independent of said flange. This sleeve of the drum or the fixed or integral flange may be provided with lugs, as at $d^3$, between which the outer end of the arm $d^4$ of the pawl $d$ is adapted to play, so that as the drum is rotated in one direction—as to the right, for instance—the lugs $d^3$, engaging the arm $d^4$ of the pawl, will tilt said pawl upon its pivot, so as to engage the teeth of the ratchet-wheel and rotate the driving-shaft, but the reverse movement of the drum will be independent of the driving-shaft. One of the lugs $d^3$ during the reverse movement will engage the arm of the pawl and tilt the latter, so as to be disengaged from the teeth of the ratchet-wheel, thereby dispensing with the usual spring and preventing clicking and noise by reason of the pawl slipping over the teeth of said wheel.

The flange $d^2$ and the sleeve should be so constructed and arranged relatively to each other that said sleeve will rotate independently of said flange just enough when rotated in one direction to cause the pawl to engage the ratchet-wheel, after which both will rotate together, while during the initial reverse rotation of the drum the independent movement will be just sufficient to disengage the pawl from the teeth of said wheel. Spiral springs $d^5$ surround the shaft $c^6$ between the frame and the drums and are secured at their outer ends to the latter, respectively, and at their inner ends to convenient members of the frame, as the bars $b$, so that each drum when rotated by its corresponding lever will compress one of said springs, and when said lever is released the recoil of the spring will take up the slack in the flexible connection $c^4$ and return the drum to its normal position. The driving-shaft has a sprocket-wheel $d^6$ secured thereto, which is connected by a sprocket-chain $d^7$ or otherwise to a preferably smaller sprocket-wheel arranged to rotate with the driving-wheel on the shaft $b'$. By this means a light and strong frame is secured and powerful and easily-operated driving mechanism provided which will effectually avoid the usual dead-centers incident to the pedals and cranks usually employed and which will permit the direct application of power through the entire stroke.

The steering mechanism may be of any desired form, but I prefer to employ means adapted to be operated by the foot of the rider. In this case I may provide a lever $e$, which is pivoted to the frame at $e'$ and has one end provided with a pedal $e^2$, arranged convenient to a platform $e^3$, (shown in dotted lines in Fig. 2,) which latter is of wicker-work or other suitable construction and supported upon the arms of the brace $b^6$, said platform being adapted to form a support for the feet of the rider. The upper end of the lever $e$ may have a universal-joint connection with a link $e^4$, the forward end of which link may be pivoted or connected to an arm $e^5$, which has one end thereof connected to the steering-post, so that as the lever $e$ is rocked on its pivot by the foot of the rider the arm $e^5$ will be thrown in the arc of a circle, so as to rotate the steering-post and guide the vehicle in the usual manner.

As a means for temporarily supporting the vehicle while the rider is mounting or dismounting I may pivot one end of a pair of arms $f$ to the shaft $c$ just outside of the operating-levers C and C' and arrange rollers $f'$ in the free ends of said arms. These arms may be connected by a transverse rod $f^2$ in order that they may be simultaneously raised or lowered on their pivots. A pedal, as at $f^3$, may be pivoted to the frame, so as to project above the platform $e^3$, and may be connected to the rod $f^2$ by a link $f^4$, so that as the pedal $f^3$ is rocked on its pivot by the foot of the rider the rollers or wheels $f'$ will be raised or lowered, a suitable locking device being preferably provided to retain the rollers in either position. While these rollers are of advantage to beginners and aged and infirm persons to permit them to mount and dismount with ease, an experienced rider may dispense with the rollers and their connections, in which case these parts may be removed from the vehicle.

The wheels A and A' may each be provided with suitable hubs or bearings $g$ and be arranged to rotate on suitable shafts. These bearings may be connected to an inner ring or rim $g$ by the usual stay wires or rods, so as to be held concentric thereto. The ring $g'$ may be of wood and is preferably provided with concaved side surfaces, so as to be substantially triangular in cross-section.

To prevent as much friction and wear as possible in the hubs or bearings of the supporting-wheels, I prefer to have each bearing comprise two drums or casings $h$. These casings are recessed and may have a removable cap $h'$ and the opposed annular plates or rings $h^2$, which latter may be provided with opposed recesses or apertures, in which the ends of the rollers $h^3$ may be journaled. The rollers may be of any desired length, so as to present as much rolling-surface as is desired in order to prevent the cutting action which occurs from the use of balls, for the reason that the latter only presents a single bearing-point, which soon destroys the wearing-surface. The rollers instead of being provided with conical ends may have reduced cylindrical ends journaled in the plates or rings $h^2$, and the bearings may have a single casing provided with opposed rings, if desired.

The operation of the invention will be readily understood from the foregoing description when taken in connection with the accompanying drawings. Assuming the parts to be in the position shown, it will be seen that the rider may readily mount the machine, so as to be comfortably seated before operating the driving mechanism. If the rider now vibrates the operating-levers C and C' back and forth on their pivots, the flexible connections $c^4$ will rotate the drums $c^5$, which will cause the pawls $d$ to engage the ratchet-wheels $d'$ and rotate the driving-shaft $c^6$, and when the machine is given sufficient momentum the supporting-wheels $f'$ may be raised above the ground by pressure of the left foot upon the pedal $f^3$. The vehicle may be guided in either direction by operating the lever $e$ with the right foot, so as to rotate the steering-post in the sockets of the frame. When it is desired to dismount, the wheels $f'$ may again be thrown to the ground, which will also serve to stop the momentum of the vehicle, and by operating the lever $b^{10}$ the brake-shoe $b^{11}$ may be forced against the wheel A, so as to stop the vehicle as quickly as desired.

I thus provide a strong, efficient, and easily-operated vehicle whereby all the power that the rider is capable of bringing into action by the use of the arms may be applied direct to the driving mechanism.

The frame may be made of tubular metallic bars or of any suitable material and braced in any desired manner, so as to properly withstand the strain to which it may be subjected while in use.

It is to be understood that in using the word "bicycle" other vehicles are included, when the parts are adapted for use with other vehicles, and that various changes may be made or some of the parts dispensed with and others substituted therefor without departing from the spirit of my invention.

Having thus fully described my invention, what I claim as new, and desire to secure by Letters Patent of the United States, is—

1. A bicycle-frame comprising a longitudinally-arranged U-shaped bar adapted to form the support for the driving-wheel shaft or axle, a forward frame-piece, a bar arranged to the rear of said frame-piece and extending upwardly and forwardly and secured to said frame-piece by suitable braces, a fork having a steering-post journaled in said bar and frame-piece, bars extending downwardly and outwardly from the frame-piece adapted to support a shaft, a rear curved bar or frame-piece, a rear fork secured thereto, and braces or rods connecting the rear fork to the bars extending downwardly from the forward frame-piece, substantially as described.

2. A bicycle-frame comprising a longitudinally-arranged U-shaped bar adapted to form the support for the driving-wheel shaft or axle, a forward frame-piece, a front fork having a steering-post journaled in a sleeve attached to said front frame, bars or rods extending downwardly and outwardly from said front frame-piece, a rear curved bar or frame-piece, a rear fork secured thereto, and forwardly and downwardly inclined braces having their rear ends attached to the rear fork, and their front ends connected with the lower ends of the bars depending from the front frame, all substantially as described.

3. A frame for bicycles, comprising a horizontal double member having bearings for the driving-shaft, a front vertical member joined to the front end of said horizontal member and having divergent downwardly-projecting branches below the same, braces extending between the lower ends of said branches and the said shaft-bearings, a cross-shaft extending between and supported by the lower ends of the divergent branches and the said braces, a front fork swiveled to the upper end of the front vertical member, a rear fork connected at its lower end with the horizontal member of the frame, and suitable braces for the said front and rear forks.

4. A frame for bicycles, comprising a horizontal double member having bearings for the driving-shaft, a front vertical member joined to the front end of said horizontal member and having divergent downwardly-projecting branches below the same, braces extending between the lower ends of said branches and the said shaft-bearings, a cross-shaft extending between and supported by the lower ends of the divergent branches and the said braces, a front fork swiveled to the upper end of the front vertical member, a rear fork connected at its lower end with the horizontal member of the frame, and side pieces connected at their rear ends with the rear fork and at their front ends with the cross-shaft, and engaged intermediate their ends with the driving-shaft.

5. In a bicycle, the combination of a horizontal double frame member having bearings for the driving-shaft, a front vertical member joined to the front end of said horizontal member and having divergent branches below the same, braces extending between the lower end of said branches and the said shaft-bearings, a cross-shaft extending between and supported by the lower ends of the divergent branches and the said braces, operating-levers pivoted on said cross-shaft, suitable connections between said levers and the driving-shaft for imparting rotary motion to the latter by vibration of said levers, a front fork swiveled to the upper end of the front vertical member, a rear fork connected at its lower end with the horizontal member of the frame, and suitable braces for the said front and rear forks.

6. In a bicycle, the combination of a horizontal double frame member having bearings for the driving-shaft, a front vertical member joined to the front end of said horizontal member and having divergent branches below the same, braces extending between the lower end of said branches and the said shaft-bearings, a cross-shaft extending between and supported by the lower ends of the divergent branches and the said braces, a front fork swiveled to the upper end of the front vertical member, a rear fork connected at its lower end with the horizontal member of the frame, suitable braces for the said front and rear forks, roller-equipped arms pivoted on said cross-shaft and connected together, and means for raising and lowering said arms, substantially as and for the purpose described.

7. A frame for bicycles, comprising a double horizontal member having bearings for the driving-shaft, a rear fork connected with the rear ends of said horizontal member, a vertical brace for said rear fork extending between the upper end of the same and the driving-shaft, a front vertical member fastened to the front end of the horizontal member, a front fork swiveled in the forward upper end of said front vertical member, a bar arranged to the rear of the latter and rigidly connected therewith and having a bearing for the stem or post of the front fork and also engaged with the driving-shaft, and a supplemental horizontal member extending between said bar and the front vertical member and secured to the same, substantially as and for the purpose described.

8. In the herein-described bicycle the combination of the frame having a longitudinally-arranged U-shaped bar $b$ adapted to form the support for the driving-wheel shaft or axle, a forward frame-piece, a front fork, bars or rods $c'$ extending downwardly and outwardly from the frame-piece, a rear fork, and braces or rods $c^7$ connecting the rear fork to the lower ends of the bars $c'$, with a foot-lever and connections for steering the machine, the opposite hand-levers pivoted at their lower ends to the lower ends of bars $c'$, a driving-shaft supported in bearings in bars $b$ and $c^7$, ratchet mechanisms for rotating said shaft, flexible connections between said ratchet mechanisms and the hand-levers, springs for returning said ratchet mechanisms to normal position, and means for transmitting motion from the driving-shaft to the rear wheel of the machine, all substantially as described.

In testimony whereof I affix my signature in presence of two witnesses.

STEPHEN D. CARPENTER.

Witnesses:
C. C. CLOVER,
L. A. BOWERS.